Sept. 29, 1942.  J. C. WALSH  2,297,089
TRUCK TAIL GATE SPREADER
Filed Oct. 4, 1940  2 Sheets-Sheet 2

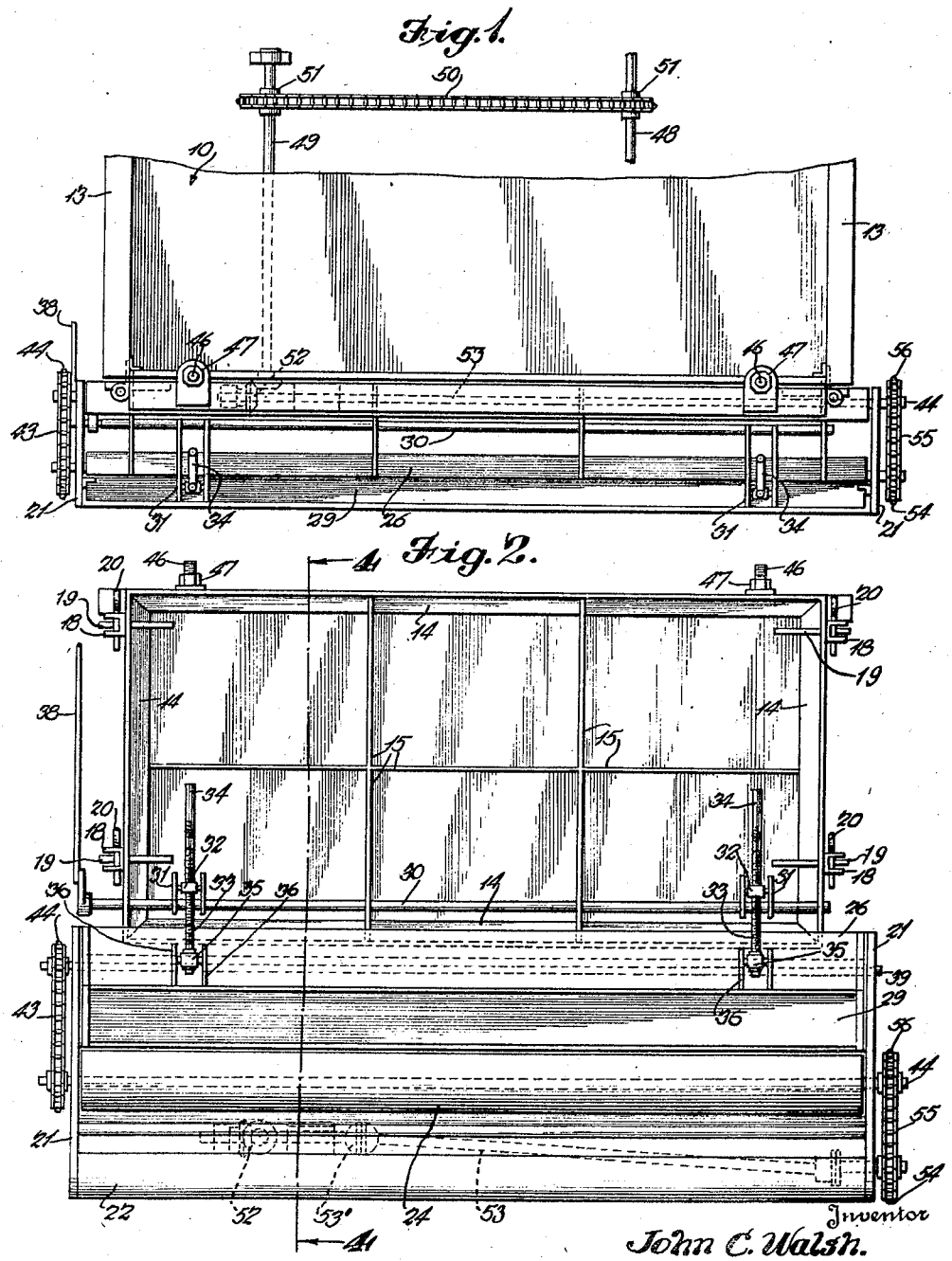

Inventor
John C. Walsh.
By
Attorney

Patented Sept. 29, 1942

2,297,089

UNITED STATES PATENT OFFICE 2,297,089

TRUCK TAIL GATE SPREADER

John C. Walsh, Joliet, Ill.

Application October 4, 1940, Serial No. 359,790

4 Claims. (Cl. 275—2)

This invention relates to a material distributing attachment for dump trucks preferably termed a truck tail gate spreader.

More especially this invention relates to a device which will place all solid building material such as sand, gravel, crushed stone, cement, calcium chloride, slag, cinders, ashes on a roadway or any other areas where such materials may be required with an even distribution; that material to come from the rear end of a power-lift dump-truck; through a crusher, then through a box, over a roller, through an orifice of adjustable height and width.

One important object of the invention is to provide a novel device of this character having a crusher to break up frozen stone, frozen sand, frozen gravel, large pieces of cinders or any other material requiring crushing.

A second important object of the invention is to provide a novel device for this purpose which is so constructed that the amount discharged can be made a definite quantity, regardless of the speed of the truck. This is, that the roller and grinder are synchronized with the engine that drives the truck.

A third important object of the invention is to provide a truck tail gate spreader operating as a part of a truck, from the power on the truck, which places all solid building material such as sand, gravel, crushed stone, cement, calcium chloride, slag, cinders and ashes on a roadway with an even distribution for thickness of deposit and with a straight edge parallel with the side of the road or curb.

A fourth object of the invention is to provide a novel device of this kind operating on a truck, as part of a truck, from the power on the truck, that has an instant opening and closing mechanism.

A fifth object of the invention is to provide a novel spreader, operating as a part of a truck, from the power on the truck which can vary the deposition of materials from one-eighth of an inch to three inches or more in depth by moving a control lever in the cab without stopping the truck to make any adjustment on the spreader. This is important if vertical curves in road or street are to be brought up to grade.

With the above and other objects in view, the invention consists in general of certain novel details of construction and combinations of parts hereinafter fully described, illustrated in the accompanying drawings and particularly pointed out in the appended claims.

In the accompanying drawings like characters of reference indicate like parts in the several views, and Figure 1 is a plan view of the rear end of a dump truck body showing the attachment constituting this invention applied thereto.

Figure 2 is a rear end view of such a dump truck showing the attachment held thereon.

Figure 3:
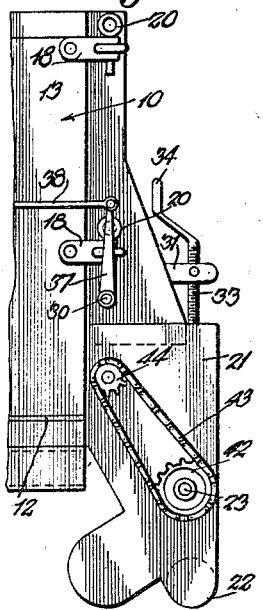
Figure 3 is a side elevation of the rear portion of a dump truck body with the invention in position.
Figure 4:
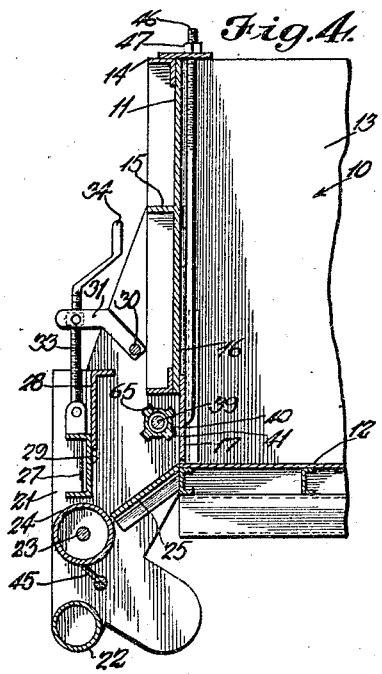
Figure 4 is a section on the line 4—4 of Figure 2.
Figure 5:
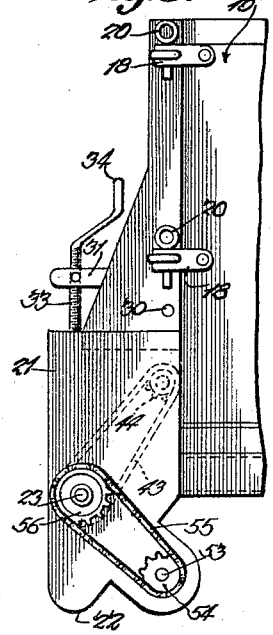
Figure 5 is a side elevation of the rear portion of a dump truck similar to Figure 3 but taken from the opposite side of the truck.

In the several embodiments of the invention as disclosed in the appended drawings the main features are identical, the different forms shown being illustrated merely to indicate different manners of driving the spreader apparatus.

In each form there is shown the rear end portion 10 of a dump truck body and it is to be understood that this body may be of any preferred type so long as it is arranged to deliver the contents of the body to the distributor forming this invention. Thus its floor may slope downwardly from front to rear or the truck may be arranged, as is common in such vehicles, to tilt the front end upwardly for delivery, or a suitable feeding means may be utilized to convey the material contained in the body to the rear end thereof for delivery to the distributor.

The rear end of the body is provided with an end wall 11 which has its lower edge spaced above the body floor 12 and extends between the side walls 13 of said body. This rear wall 11 is carried by the attachment forming this invention and is only positioned at the rear of the body when the present invention is secured thereto. Otherwise the rear end of the body 10 is open. The wall 11 may therefore be termed the front wall of the present invention.

This front wall 11 is stiffened and supported by an angle iron frame 14 and ribs 15 so that the pressure of the load in the body 10 will not distort the wall 11.

On the front face of the wall 11 and at each side thereof there is provided a guide 16 wherein is slidably mounted a door or cut-off 17 which serves to close and open the space between the lower edge of the wall 11 and the floor 12 of the body.

Vertically spaced forked lugs 18 are secured to each side of the body 10 and project rearwardly therefrom so that eyes 19 carried by the frame 14 may fit in the forks of these lugs and receive removable pins 20. This arrangement provides means whereby the invention may be detachably secured to the body 10.

Projecting below the frame 14 is a pair of hopper side walls 21 which drop well below the bottom of the bottom of the body 10 and form hopper sides connected at their lower ends by a suitable tie here shown as pipe member 22. Journalled in the walls 21 adjacent the rear edges thereof and below the floor 12 is a shaft 23 carrying a delivery drum 24. Extending downwardly and rearwardly from the lower edge of the door in its closed position is a hopper bottom 25 which has its lower edge in proximity to the drum 24, such edge being so close to the drum that material to be delivered cannot escape between the drum 24 and bottom 25. A hopper rear wall 26 is fixed between the upper parts of the sides 21 and is spaced above the drum 24. Just to the rear of the wall 26 each side plate 21 carries a guide 27 and in these guides slides a delivery regulating door or gate 29 movable toward and from the drum 24 to leave a space through which material from the hopper may pass. In order to regulate the position of this gate a shaft 30 extends across the frame 14 and is journalled therein. This shaft 30 has fixed thereon pairs of arms 31 which project rearwardly from the shaft to carry swivel nuts 32 each supported between a pair of said arms 31. Through these nuts 32 extend adjusting screws 33 having crank handles 34. The lower ends of these screws are swivelled in blocks 35 supported between pairs of arms 36 fixed to the upper edge of the gate. An operating lever 37 is fixed to one end of the shaft 30 and is connected by a link 38 with any suitable means (not shown) whereby the operator of the vehicle may actuate the lever 37 and thus open and close the gate 29, the screws being used for adjusting the opening movement of said gate.

A shaft 39 is journalled in the side plates 21 and carries a breaker or crusher drum 40 having teeth 41. This drum extends across the opening provided by the door or gate 17 when the latter is raised. On one end of the shaft 23 is a sprocket 42 which is connected by a chain 43 to a sprocket 44 fixed on the shaft 39. A brush or scraper 45 is provided to keep the drum free from adhering material.

The gate 17 constitutes the tail gate of the body 10 and is raised and lowered by the rods 46 and nuts 47. This gate is normally open when the device of the invention is attached to the rear of the body 10 so that the hopper of the attachment may be freely filled, all control of delivery being effected by movement of the gate 29.

Various means may be used for actuating the device to deliver material. For instance, as in Figures 1 and 2 the drive shaft 48 of the truck may be connected to a jack shaft 49 by a chain 50 and sprockets 51. The jack shaft 49 is connected by bevel gears 52 with a transverse shaft 53 including sections connected by a universal joint 53'. The shaft 53 has a sprocket 54 fixed thereon which is connected by a chain 55 with a sprocket 56 fixed on shaft 23.

Figure 6:
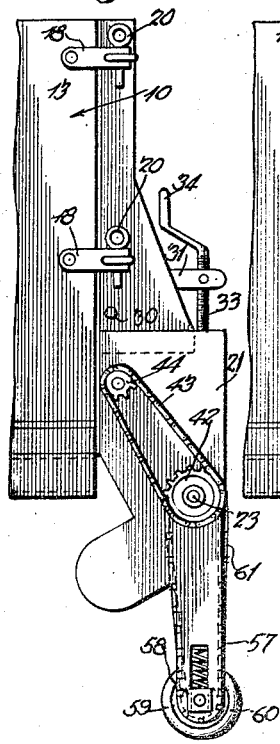
Figure 6 is a detail showing one modification of the driving means.

In a second form of the drive as shown in Figure 6 the sides 21 are extended downwardly as at 57 to support a shaft 58 carrying a rubber tired wheel or other suitable ground engaging roller 59. A sprocket 60 is fixed on the shaft 58 and is connected by a chain 61 with a suitable support on the shaft 23.

In the third form of the device there is employed an internal combustion engine 62 connected by a chain 63 with a sprocket 44 on the shaft 39 and the shaft 39 is connected by a chain 43 with the shaft 23, suitable sprockets being, of course, employed.

Figure 8:
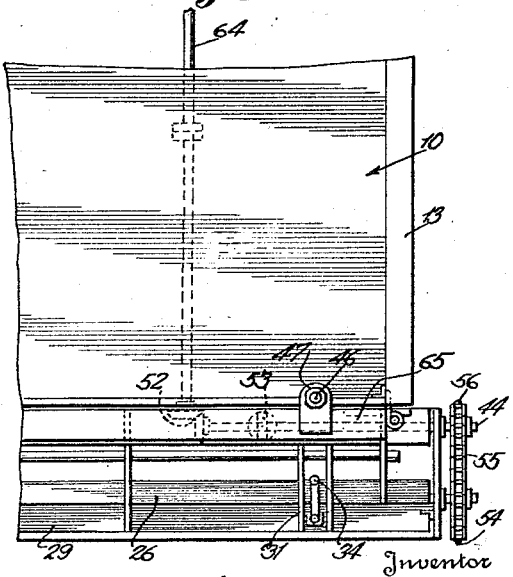
Figure 8 is a detail showing a third modification of the driving means.

In a fourth form of the device the shaft 64 (Figure 8) may be driven from the vehicle motor and connected directly to a transverse shaft 65 and the device driven as at first described.

In the operation of this device the same is attached to the rear end of a dump truck body by the pins 20. The gate 17 is kept permanently open so that the material from the dump truck body can flow into the hopper. Now, as has been previously described the gate 29 is movable vertically toward and from the delivery roller 24. This movement is effected by rotation of the shaft 30 by means of the lever 37 and link 38 so that it is at all times under control by the operator of the vehicle. Thus the operator may start his delivery at any desired point and may stop such delivery at any other desired point. For instance if the vehicle arrives at a crossing where it is not desired to dump material the operator simply closes the gate 29 while passing across such crossing and opens the same when he arrives at the other side of the crossing. The screws 33 serve to regulate the extent of opening between the gate 29 and the roller 24 so that the operator can always be assured of the distribution of an even layer of the contents of the dump truck onto the road bed or the like. Obviously, the driving means for the roller 24 will assure such delivery when the gate is open. Moreover, since the roller 24 and breaker 40 are connected to operate in unison any of the material passing from the dump truck will be broken up by the roller or breaker 40 so that it can pass between the roller 24 and gate 29 without obstruction.

It is not necessary to remove the truck tail gate spreader to use the truck for any ordinary purposes for which dump trucks are used, as shaft 53 is a slip joint shaft and can be disengaged. If desired the spreader can be removed from the vehicle body by withdrawing the pins 20.

Figure 7:
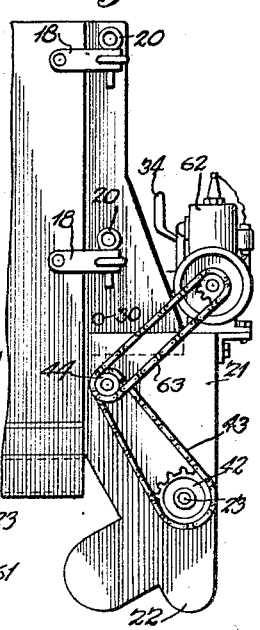
Figure 7 is a detail showing a second modification of the driving means.

In the form shown in Figure 7 it is intended that the engine 62 shall work in timed relation with the driving engine of the truck in order that a uniform delivery of fertilizer shall take place.

If desired a gear box may be mounted in the rear of the power take-off and between the power take-off and the jack shaft. This gear box is not shown since gear boxes for the purpose of varying speed between shaft sections are old and well known.

What is claimed, is:

1. In an attachment for dump trucks having a body, a hopper adapted to be secured to the rear end of such body to receive material from the body, and a delivering roller at the bottom of said hopper, said hopper having a rear end gate positioned above said delivery roller and movable vertically towards and from said roller, a ground engaging roller spring supported by said attachment, and an operative connection between said ground and delivery rollers.

2. In an attachment for dump trucks having a body, a hopper adapted to be secured to the rear end of such body to receive material from the body, a delivering roller at the bottom of said hopper, said hopper having a rear end gate positioned above said delivery roller and movable vertically towards and from said roller, means adapted to be actuated by the operator of the vehicle for raising and lowering said gate, a ground engaging roller spring supported by said attachment, and an operative connection between said ground and delivery rollers.

3. In an attachment for dump trucks having a body, a hopper adapted to be secured to the rear end of such body to receive material from the body, a delivering roller at the bottom of said hopper, said hopper having a rear end gate positioned above said delivery roller and movable vertically towards and from said roller, means adapted to be actuated by the operator of the vehicle for raising and lowering said gate, said means including adjusting devices for regulating the separation of said gate from said roller, a ground engaging roller spring supported by said attachment, and an operative connection between said ground and delivery rollers.

4. In an attachment for dump trucks having a body, a hopper adapted to be secured to the rear end of such body to receive material from the body, and a delivering roller at the bottom of said hopper, said hopper having a rear end gate positioned above said delivery roller and movable vertically towards and from said roller, a ground engaging roller spring supported by said attachment, an operative connection between said ground and delivery rollers, a breaking roller extending across the hopper at the front side thereof, and means operatively connecting the breaking and delivery rollers.

JOHN C. WALSH.